US012649156B2

(12) United States Patent
Malone et al.

(10) Patent No.: US 12,649,156 B2
(45) Date of Patent: Jun. 9, 2026

(54) GYRATORY CRUSHER WITH SELF-ALIGNING MAINSHAFT FEATURES AND METHOD OF ASSEMBLY THEREOF

(71) Applicant: FLSmidth A/S, Valby (DK)

(72) Inventors: William George Malone, Sandy, UT (US); Stephen Richard Harris, Emmaus, PA (US)

(73) Assignee: FLSmidth A/S (DK)

( * ) Notice: Subject to any disclaimer, the term of this patent is extended or adjusted under 35 U.S.C. 154(b) by 22 days.

(21) Appl. No.: 18/543,525

(22) Filed: Dec. 18, 2023

(65) Prior Publication Data

US 2024/0299947 A1 Sep. 12, 2024

Related U.S. Application Data

(63) Continuation of application No. 18/025,569, filed on Mar. 9, 2023, now Pat. No. 11,850,600.

(51) Int. Cl.
*B02C 2/04* (2006.01)
*B02C 2/00* (2006.01)
*B02C 2/02* (2006.01)

(52) U.S. Cl.
CPC .............. *B02C 2/042* (2013.01); *B02C 2/005* (2013.01); *B02C 2/02* (2013.01); *B02C 2/04* (2013.01)

(58) Field of Classification Search
CPC .. B02C 2/02; B02C 2/04; B02C 2/042; B02C 2/005
See application file for complete search history.

(56) References Cited

U.S. PATENT DOCUMENTS 1,533,991 A * 4/1925 Jorgensen ................. B02C 2/06 241/215
2,022,135 A * 11/1935 Newhouse ................ B02C 2/06 241/231
2,135,324 A * 11/1938 Boswell ..................... B02C 2/04 241/290
2,147,833 A * 2/1939 Fahrenwald .............. B02C 2/04 241/290
2,484,971 A * 10/1949 Traylor, Jr. ............... B02C 2/06 277/408
4,454,994 A * 6/1984 Johnson ..................... B02C 2/04 241/215

(Continued)

FOREIGN PATENT DOCUMENTS

RU 2705539 C2 * 11/2019 ............... B02C 2/04

*Primary Examiner* — Christopher L Templeton
*Assistant Examiner* — Matthew Stephens
(74) *Attorney, Agent, or Firm* — Jeffrey A. Sharp

(57) ABSTRACT

The disclosure relates to novel components of a gyratory crusher (1) which aim to promote self-alignment of a mainshaft assembly (2) upon introduction of the mainshaft assembly (2) into the gyratrory crusher (1) by lowering the mainshaft assembly (2) from above the gyratory crusher (1) into the gyratory crusher (1). The novel components may include a dust bonnet (9) having a plurality of guides (15), an end plate (32) having a lower alignment chamfer (36), and/or a counterweight (13) having an alignment chamfer (41). Each of the novel components may be configured to bias a lower mainshaft (26) of the mainshaft assembly (2) of the gyratory crusher (1) into concentric alignment with a bore (56) of the eccentric (11) or eccentric liner (12).

14 Claims, 15 Drawing Sheets

(56) References Cited

U.S. PATENT DOCUMENTS

| | | | | | |
|---|---|---|---|---|---|
| 4,919,348 | A * | 4/1990 | Johnson | B02C 2/04 | 241/215 |
| 4,919,349 | A * | 4/1990 | Johnson | B02C 2/04 | 241/215 |
| 5,080,294 | A * | 1/1992 | Dean | B02C 2/005 | 241/300 |
| 5,718,390 | A * | 2/1998 | Ganser, IV | B02C 2/045 | 241/36 |
| 5,810,269 | A * | 9/1998 | Shannon | B02C 2/06 | 241/207 |
| 10,493,459 | B2 * | 12/2019 | Aberg | B02C 2/047 | |
| 11,143,306 | B1 * | 10/2021 | Hunter | B02C 2/007 | |
| 2009/0289135 | A1 * | 11/2009 | Solomon | B02C 2/04 | 241/207 |
| 2011/0290925 | A1 * | 12/2011 | Johansson | B02C 2/00 | 277/504 |
| 2012/0006918 | A1 * | 1/2012 | Belotserkovskiy | B02C 2/04 | 241/207 |
| 2012/0260798 | A1 * | 10/2012 | Solomon | B02C 2/06 | 92/165 R |
| 2016/0008817 | A1 * | 1/2016 | Bergman | B02C 2/02 | 241/215 |
| 2016/0250643 | A1 * | 9/2016 | Henssien | F16J 15/3452 | 241/216 |
| 2018/0243745 | A1 * | 8/2018 | Niklewski | F16J 15/3208 | |
| 2019/0070613 | A1 * | 3/2019 | Holmberg | B02C 2/042 | |
| 2020/0306762 | A1 * | 10/2020 | Boulay | B02C 2/04 | |

* cited by examiner

GYRATORY CRUSHER WITH SELF-ALIGNING MAINSHAFT FEATURES AND METHOD OF ASSEMBLY THEREOF

FIELD OF THE INVENTION

This application pertains to crushers, particularly gyratory crushers. More particularly, this application relates to a method for assembling a gyratory crusher including introducing a main shaft assembly into the crusher.

BACKGROUND OF THE DISCLOSURE

Gyratory crushers comprise a mainshaft assembly which rests within a lined eccentric. During routine maintenance of such crushers, it is required to periodically remove the mainshaft assembly to gain access to internals, service the mainshaft assembly, or service other components within the crusher.

Difficulties exist in aligning the mainshaft assembly upon reintroduction of the same into the gyratory crusher. This is, in part, because the axial line of the mainshaft and the rotation axis line of the eccentric bushing are not parallel. Instead, the lines intersect at a so-called "pivot point" which typically is located above the crushing surfaces.

Present methods for removing the main shaft assembly generally do not involve much risk of personal injury when performed in accordance with specified procedures. However, present methods of re-installing the mainshaft assembly back into the gyratory crusher involve significant risk of injuries—since operators must work underneath an overhead suspended main shaft assembly (which can weigh as much as 100 tons) to guide the mainshaft into place and prevent seals from being compromised.

During conventional mainshaft installation, personnel guide the mainshaft assembly manually into the offset/off-kilter eccentric bushing. In some gyratory crushers, personnel may also have to manually guide a seal located on the main shaft into a sealing sleeve bore while working underneath the mainshaft assembly.

Any failure of the lifting equipment, the crane, cable or lifting hook or erroneous crane operation might risk serious or fatal injury to the operator below. Pinch point hazards also exist during the process.

It is therefore desired to carry out mainshaft assembly installation in a manner which mitigates risk for the operators involved. In particular, there is a need to obviate the need to place maintenance personnel below a mainshaft assembly for purposes of guiding a distal end of the mainshaft assembly into an eccentric. There further exists a need to obviate the requirement of manual intervention to ensure seals are not compromised (e.g., bent, folded, jammed, caught, impinged) upon introduction of a mainshaft assembly into a gyratory crusher.

OBJECTS OF THE INVENTION

It is, therefore, an objective of the invention to circumvent the aforementioned dangers associated with prior art gyratory crusher devices.

It is also an objective of embodiments to provide a safer method for installing a mainshaft assembly into a gyratory crusher through the provision of self-alignment means for minimizing human exposure to danger and unnecessary risk.

It is a further objective of embodiments to provide a quick, cost-effective, and efficient manner in which to introduce a distal end of a mainshaft assembly into a lined eccentric.

This and other objects of the invention will be apparent from the drawings and description herein. Although every object of the invention is believed to be attained by at least one embodiment of the invention, there is not necessarily any one embodiment of the invention that achieves all of the objects of the invention.

BRIEF SUMMARY OF THE INVENTION

Disclosed, is an annular dust bonnet (9) for a gyratory crusher (1). The dust bonnet (9) may be configured to facilitate alignment between a mainshaft assembly (2) and a bore (56) of an eccentric (11) or eccentric liner (12) upon the introduction of the mainshaft assembly (2) into the gyratory crusher (1); for example, by lowering the mainshaft assembly (2) from above the gyratory crusher (1) into the gyratory crusher (1). The dust bonnet (9) may comprise an inner sidewall (22) configured for receiving a lower mainshaft (26) of the mainshaft assembly (2) therethrough, and an outer sidewall (52) configured for engaging an annular dust seal (10) provided within the mainshaft assembly (2).

The dust bonnet (9) may comprise a plurality of guides (15) arranged radially-inwardly with respect to the inner sidewall (22). Each of the plurality of guides (15) may have a guiding surface (15') configured to contact the mainshaft assembly (2). The guiding surface (15') may form an angle (58) with respect to the inner sidewall (22), such that a lower portion of each guiding surface (15') may be positioned further radially-inwardly with respect to the inner sidewall (22) than a respective upper portion of each guiding surface (15'). The guides (15) may collectively be arranged and/or configured to bias the lower mainshaft (26) into concentric alignment with the bore (56); for example, when the mainshaft assembly (2) is lowered into the gyratory crusher (1), without limitation.

In some embodiments, the dust bonnet (9) may comprise a plurality of guide mounts (14) provided to the inner sidewall (22). Each of the guide mounts (14) may be configured to support and supporting a respective one of said guides (15); for example, in at least a radial direction, without limitation.

According to some embodiments, each of the guide mounts (14) may extend radially-inwardly from the inner sidewall (22), without limitation.

According to some embodiments, each of the guides (15) may be removably affixed to one of the guide mounts (14). For example, one or more fasteners (16, 24) may extend through one or more apertures (16, 17) of each guide (15) and into its respective guide mount (14), without limitation.

According to some embodiments, each of the guide mounts (14) may comprise an inclined base surface (20). The inclined base surface (20) may be configured for supporting its respective one of said guides (15), without limitation.

According to some embodiments, each of the guide mounts (14) may comprise side rails (21). The side rails (21) may protrude further radially-inwardly than the inclined base surface (20), without limitation.

According to some embodiments, the side rails (21) may be configured to provide lateral support for the guides (15). The side rails (21) may alternatively or additionally facilitate positioning of the guides (15) with respect to their respective guide mounts (14), without limitation. The side rails (21) may comprise one or more side apertures (19) for receiving side pins (24) or other fasteners or fastening means to secure guides (15) to guide mounts (14), without limitation.

According to some embodiments, the dust bonnet may comprise a lower sidewall (23). The lower sidewall may extend radially inwardly with respect to the inner sidewall (22). The lower sidewall (23) may form an inner annular lip or inner annular flange proximate a lower portion of the dust bonnet (9). According to some embodiments, the guide mounts (14) may be generally configured as triangular prisms or gussets, without limitation.

According to some embodiments, the inclined base surface (20) may extend at an angle (58) between the inner sidewall (22) and lower sidewall (23), relative to the inner sidewall (22), without limitation.

According to some embodiments, the dust bonnet (9) may comprise an annular upper radially-outer chamfer (49). The upper radially-outer chamfer (49) may be located proximate an upper rim of the dust bonnet (9), without limitation. The upper radially-outer chamfer (49) may be configured to engage a complementary annular lower radially-inner chamfer (50) of a dust seal (10), without limitation. The upper radially-outer chamfer (49) may be configured to bias the dust seal (10) into concentric alignment with the dust bonnet (9). The upper radially-outer chamfer (49) may be configured to guide the dust seal (10) over an outer surface (52) of the dust bonnet (9) when the mainshaft assembly (2) is lowered into the gyratory crusher (1), without limitation.

According to some embodiments, the guides (15) may be configured to bias the lower mainshaft (26) into concentric alignment with one or more annular oil seals (53); for example, one or more annular oil seals (53) which may be located below the guides (15). This may be accomplished, for example, by virtue of sliding contact with the lower mainshaft (26) (e.g., sliding contact between guide surfaces 15' and outer surfaces of mainshaft (26)—including surfaces of an end plate (32) provided thereto), when the mainshaft assembly (2) is lowered into the gyratory crusher (1), without limitation.

An end plate (32) for provision to a lower distal end of a mainshaft assembly (2) of a gyratory crusher (1) is further disclosed. The end plate (32) may comprise a lower side and an upper side. The lower side may be configured to rest on a thrust bearing (48) (e.g., located above a hydraulic cylinder (59)), without limitation. The upper side of the end plate (32) may be configured to be received in a recess (46) (e.g., provided in a lower mainshaft (26) of the mainshaft assembly (2)), without limitation. The recess (46) may be defined by a bottom surface (29) of the lower mainshaft (26) which may be surrounded by a lower annular projection (28) of the lower mainshaft (26), without limitation.

The end plate (32) may be configured to bias a lower mainshaft (26) of the mainshaft assembly (2) into concentric alignment with a bore (56) of an eccentric (11) or eccentric liner (12); for example, upon the introduction of the mainshaft assembly (2) into the gyratory crusher (1) by lowering the mainshaft assembly (2) from above the gyratory crusher (1) into the gyratory crusher (1). This may be accomplished, for example, by virtue of a lower alignment chamfer (36) being provided to the end plate (32) at its radially-outermost periphery. The lower alignment chamfer (36) may be configured to synergistically work with guide surfaces (15') of guides (15), without limitation.

According to some embodiments, the end plate (32) may be configured to bias the lower mainshaft (26) of the mainshaft assembly (2) into concentric alignment with one or more annular oil seals (53) configured to surround the lower mainshaft (26) of the mainshaft assembly (2); for example, upon the introduction of the mainshaft assembly (2) into the gyratory crusher (1) by lowering the mainshaft assembly (2) from above the gyratory crusher (1) into the gyratory crusher (1), without limitation.

According to some embodiments, the lower alignment chamfer (36) may be configured to smoothly transition to a lower alignment chamfer (27) which may be provided proximate to the lower annular projection (28) of the lower mainshaft (26).

According to some embodiments, the end plate (32) may comprise an upper annular lip (38). The upper annular lip (38) may surround an upper projection (45) provided to the end plate (32). The upper annular lip (38) may be configured to seat against a lower surface of the lower annular projection (28) of the mainshaft assembly (2), without limitation.

According to some embodiments, the upper projection (45) may be configured to be received in the recess (46) provided in the lower mainshaft (26), without limitation.

According to some embodiments, an upper surface of the upper projection (45) may be configured to seat against the bottom surface (29) of the of the lower mainshaft (26), without limitation.

According to some embodiments, the upper annular lip (38) may intersect the lower annular chamfer (36) to form a top annular edge (60); e.g., at the widest part of the end plate (32), without limitation.

According to some embodiments, the lower alignment chamfer (36) may be configured to blend with the lower alignment chamfer (27) provided proximate the lower annular projection (28) of the lower mainshaft (26), without limitation. The two lower alignment chamfers (36, 37) may blend together such that the lower alignment chamfer (36) of the end plate (32) is flush with the lower alignment chamfer (27), without limitation. The two lower alignment chamfers (36, 37) may blend together such that the lower alignment chamfer (36) shares the same (or similar) taper angle with lower alignment chamfer (27), without limitation.

A counterweight (13) for a gyratory crusher (1) is also disclosed. The counterweight may be adapted for provision to an upper portion of an eccentric (11) and/or eccentric liner (12) within the gyratory crusher (1). The counterweight (13) may have an upper side and an underside. According to some embodiments, the counterweight (13) may comprise a unique C-shaped arcuate profile having two ends. The counterweight (13) may also comprise a concave alignment chamfer (41).

The alignment chamfer (41) may be defined by a ramped surface which faces upwardly and radially-inwardly (with respect to the c-shaped arcuate profile, eccentric (11), and/or liner (12)). The ramped surface defining the alignment chamfer (41) may extend between the upper side and the underside of the counterweight. The ramped surface may extend between the two ends of the C-shaped arcuate profile. Accordingly, the counterweight (13) may be narrower in width across its upper side than across its underside, without limitation.

According to some embodiments, the alignment chamfer (41) may be configured to bias a lower mainshaft (26) of a mainshaft assembly (2) of the gyratory crusher (1) into concentric alignment with a bore (56) of the eccentric (11) or eccentric liner (12) to which it is provided; for example, upon the introduction of the mainshaft assembly (2) into the gyratory crusher (1) by lowering the mainshaft assembly (2) from above the gyratory crusher (1) into the gyratory crusher (1), without limitation.

According to some embodiments, the counterweight (13) may comprise projections (42) on the underside of the counterweight (13), without limitation.

According to some embodiments, the counterweight (13) may comprise mounting holes (43). The mounting holes (43) may extend through the counterweight (13) and be configured to secure the counterweight (13) to the eccentric (11) and/or eccentric liner (12), without limitation. For example, the mounting holes (43) may be configured to secure the counterweight (13) to an upper portion of an eccentric (11) and/or eccentric liner (12).

According to some embodiments, at least one of the mounting holes (43) may pass through one of the projections (42), without limitation. In some embodiments all mounting holes (43) may pass through respective projections (42), without limitation.

A gyratory crusher (1) can benefit from the above apparatus. For example, a gyratory crusher (1) according to some embodiments may comprise the dust bonnet (9) described above, the end plate (32) described above, or the counterweight (13) described above. In some embodiments, the gyratory crusher (1) may comprise the dust bonnet (9) described above in combination with the end plate (32) or counterweight (13) described above. In some embodiments, the gyratory crusher (1) may comprise the end plate (32) and counterweight (13) described above. In some embodiments, all three of the dust bonnet (9), end plate (32) and counterweight (13) described above may be provided to the gyratory crusher, without limitation.

BRIEF SUMMARY OF THE DRAWINGS

To complement the description which is being made, and for the purpose of aiding to better understand the features of the invention, a set of drawings illustrating new and novel methods and apparatus for assisting self-centering and alignment during mainshaft assembly 2 installation is attached to the present specification as an integral part thereof, in which the following has been depicted with an illustrative and non-limiting character. It should be understood that like reference numbers used in the drawings (if any are used) may identify like components.

Prior art

Figure 1:
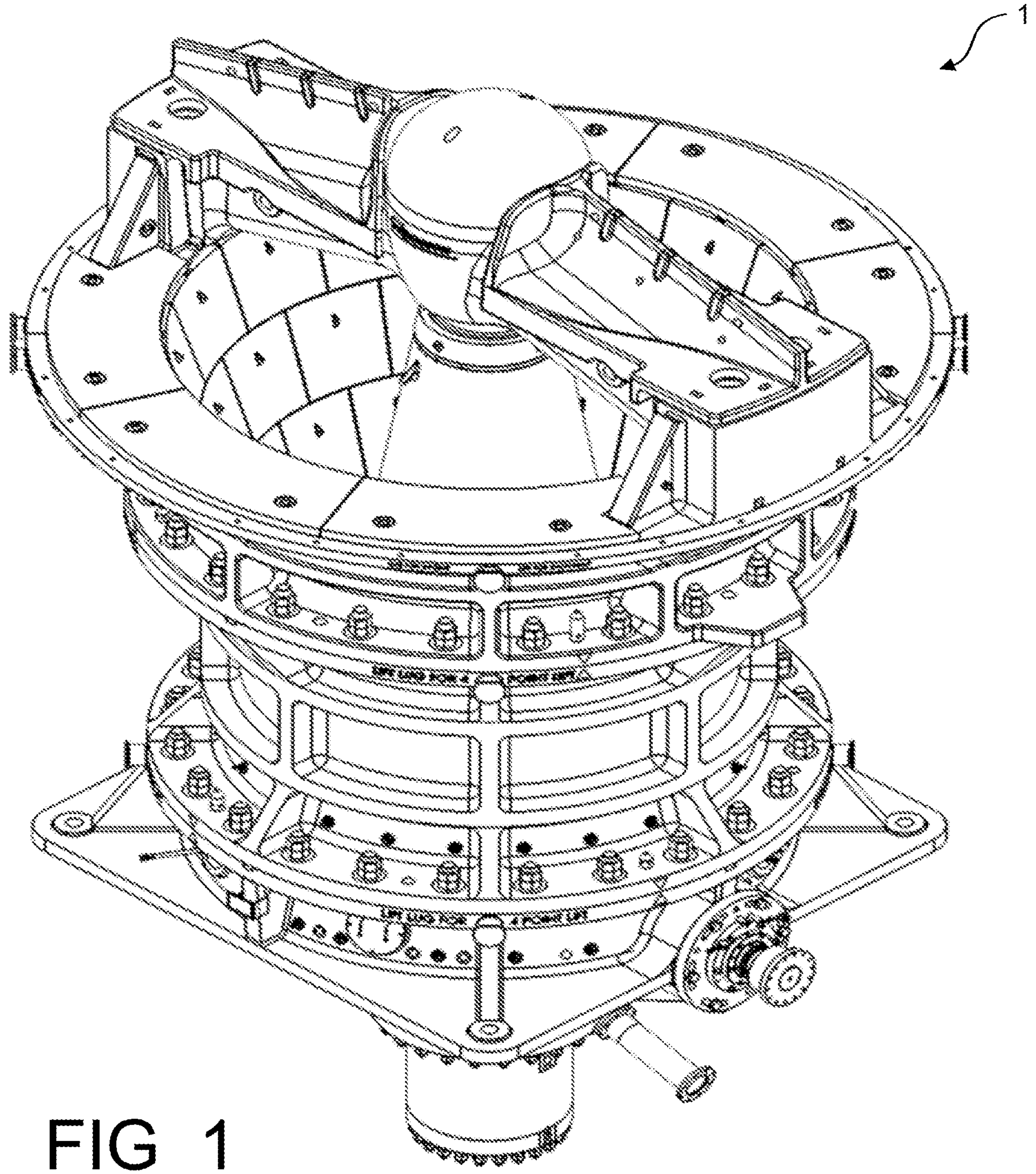
FIG. 1 illustrates a novel and inventive gyratory crusher 1 according to some exemplary, non-limiting embodiments.

In the following, the invention will be described in more detail with reference to drawings in conjunction with exemplary embodiments.

DETAILED DESCRIPTION

While the present invention has been described herein using exemplary embodiments of a gyratory crusher 1 and method of assembling the same, it should be understood that numerous variations and adaptations will be apparent to those of ordinary skill in the field from the teachings provided herein.

The detailed embodiments shown and described in the text and figures should not be construed as limiting in scope; rather, all provided embodiments should be considered to be exemplary in nature. Accordingly, this invention is only limited by the appended claims.

The inventors have recognized a novel and heretofore unappreciated gyratory crusher 1 which includes features which are configured to assist centering of a mainshaft assembly 2 upon the introduction of the same, without limitation. For example, novel features described herein are configured to promote self-centering and/or self-aligning when lowering a portion (e.g., lower mainshaft 26) of the mainshaft assembly 2 into a liner 12 of an eccentric 11, without limitation.

When a component of the gyratory crusher 1 is worn (including, but not limited to, an eccentric liner 12, mantle 7, dust seal 10, lower mainshaft 26, concave 8, or other component), a spider 6 may be removed from the gyratory crusher 1 and the mainshaft assembly 2 removed by lifting the mainshaft assembly 2 upwardly from the gyratory crusher 1 via an overhead crane. The mainshaft assembly 2 may need to be removed completely from the gyratory crusher 1 to replace a mantle 7 thereon, or, to gain access to replace portions of concave 8 which have worn.

Figure 2:
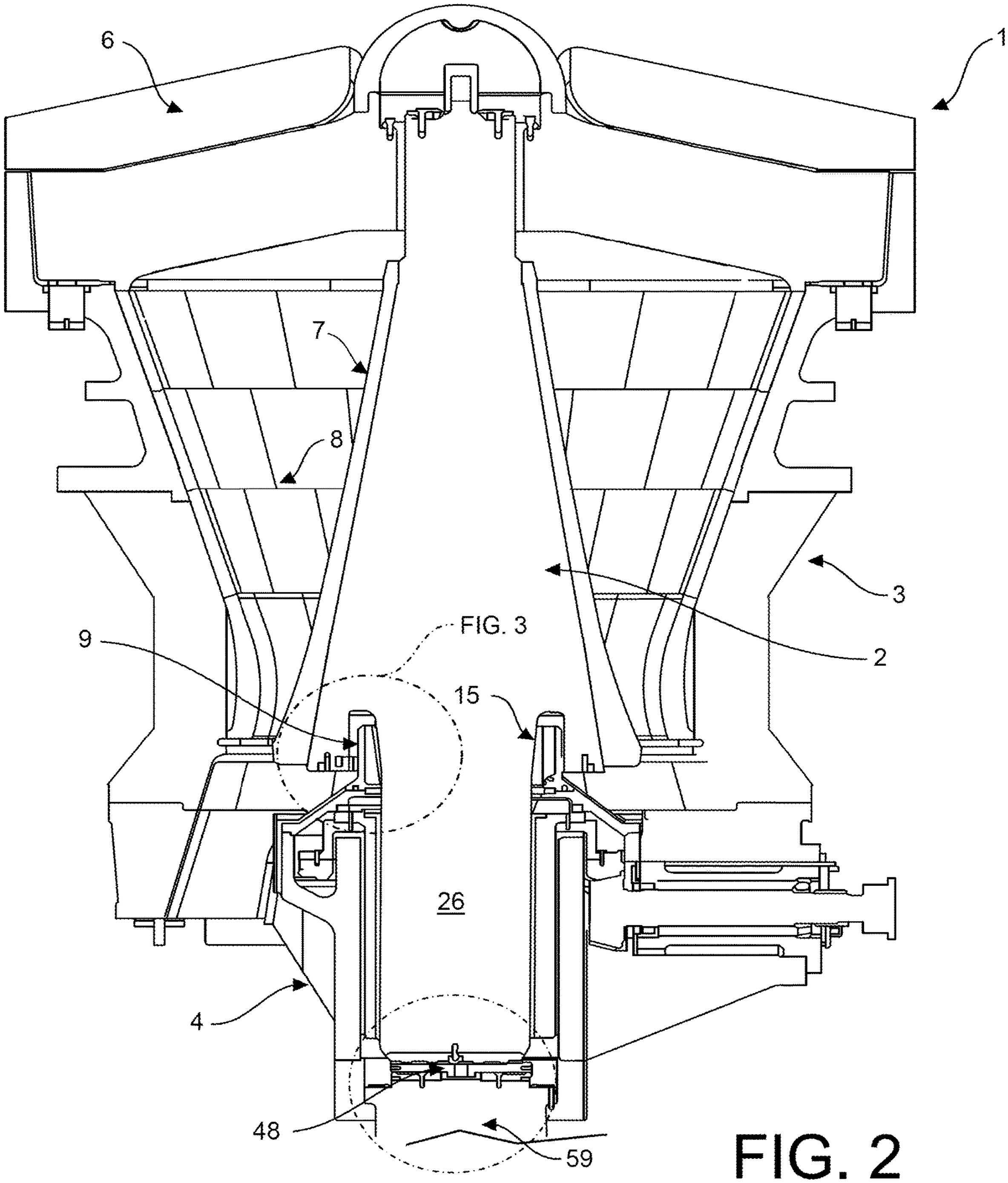
FIG. 2 illustrates a side cutaway view of the gyratory crusher 1 shown in FIG. 1.

Turning now to FIGS. 1 and 2, a gyratory crusher 1 according to embodiments comprises a mainshaft assembly 2. The mainshaft assembly 2 comprises a mantle 7 (e.g., outer crushing surface liner), a lower mainshaft 26 adjacent its lower distal portion, and a lift hook 47 adjacent its upper proximal portion.

The gyratory crusher 1 may further comprise a mainframe which may include a lower top shell 3, a bottom shell 4, and a top shell 5, without limitation. Any two or more of the shell portions 3, 4, 5 may be made integral with each other, without limitation. A spider 6 may span a top opening as shown. A concave 8 (e.g., inner crushing surface liner) may protect the inner portions of the mainframe. The mainshaft assembly 2 may be received within a liner 12 of an eccentric 11. An annular dust bonnet 9 may be provided around the mainshaft assembly 2, and an annular dust seal 10 may be provided around an outer surface of the dust bonnet 9. A counterweight 13 may be affixed to an upper portion of eccentric 11 and/or eccentric liner 12. The counterweight 13 may comprise a non-annular arcuate shape (e.g., a "C" shape), as shown, without limitation.

Figure 3:
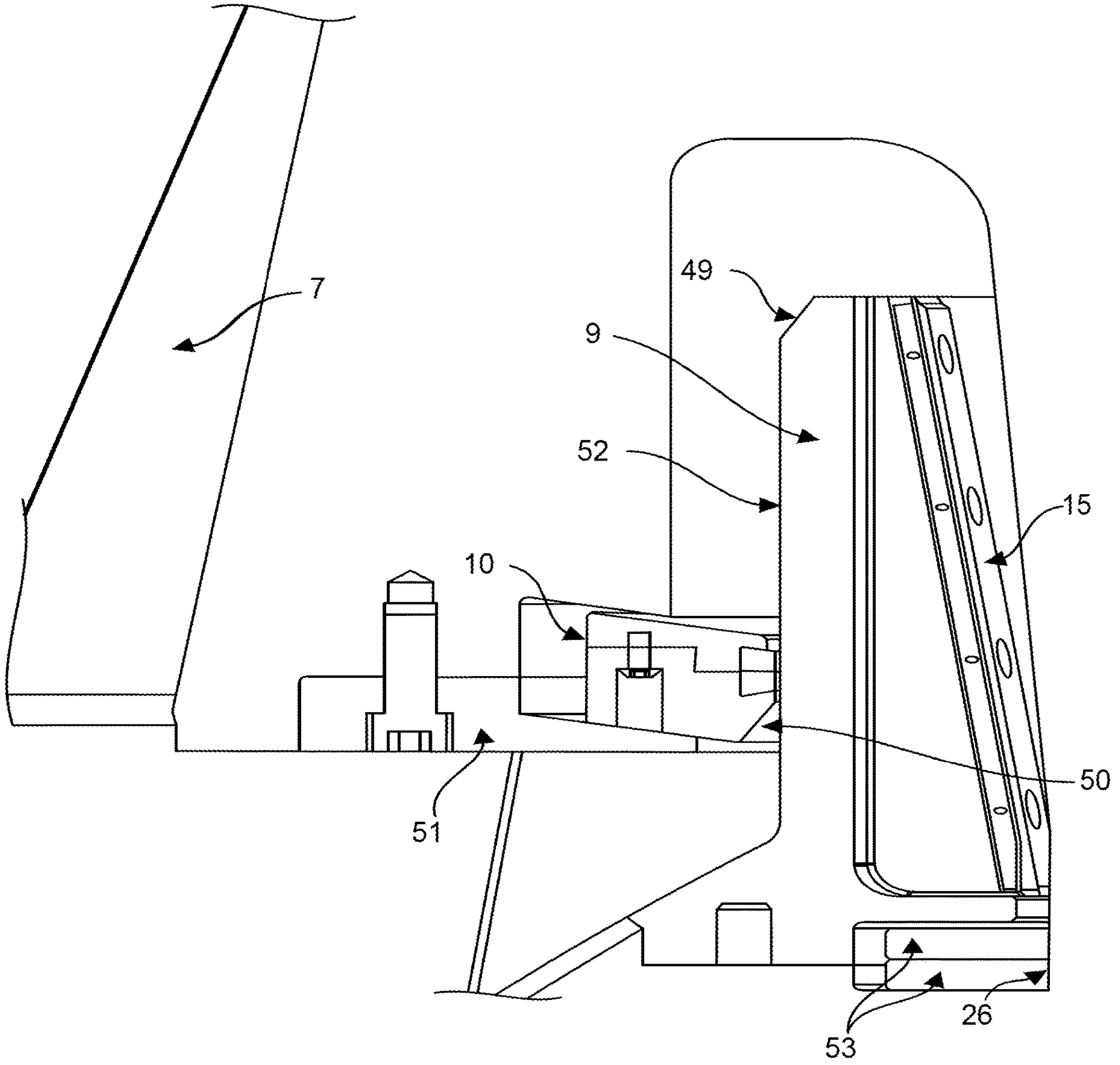
FIG. 3 illustrates an enlarged portion of FIG. 1 more clearly showing a region adjacent a dust seal 10 and dust bonnet 9 of the gyratory crusher 1.
Figure 4:
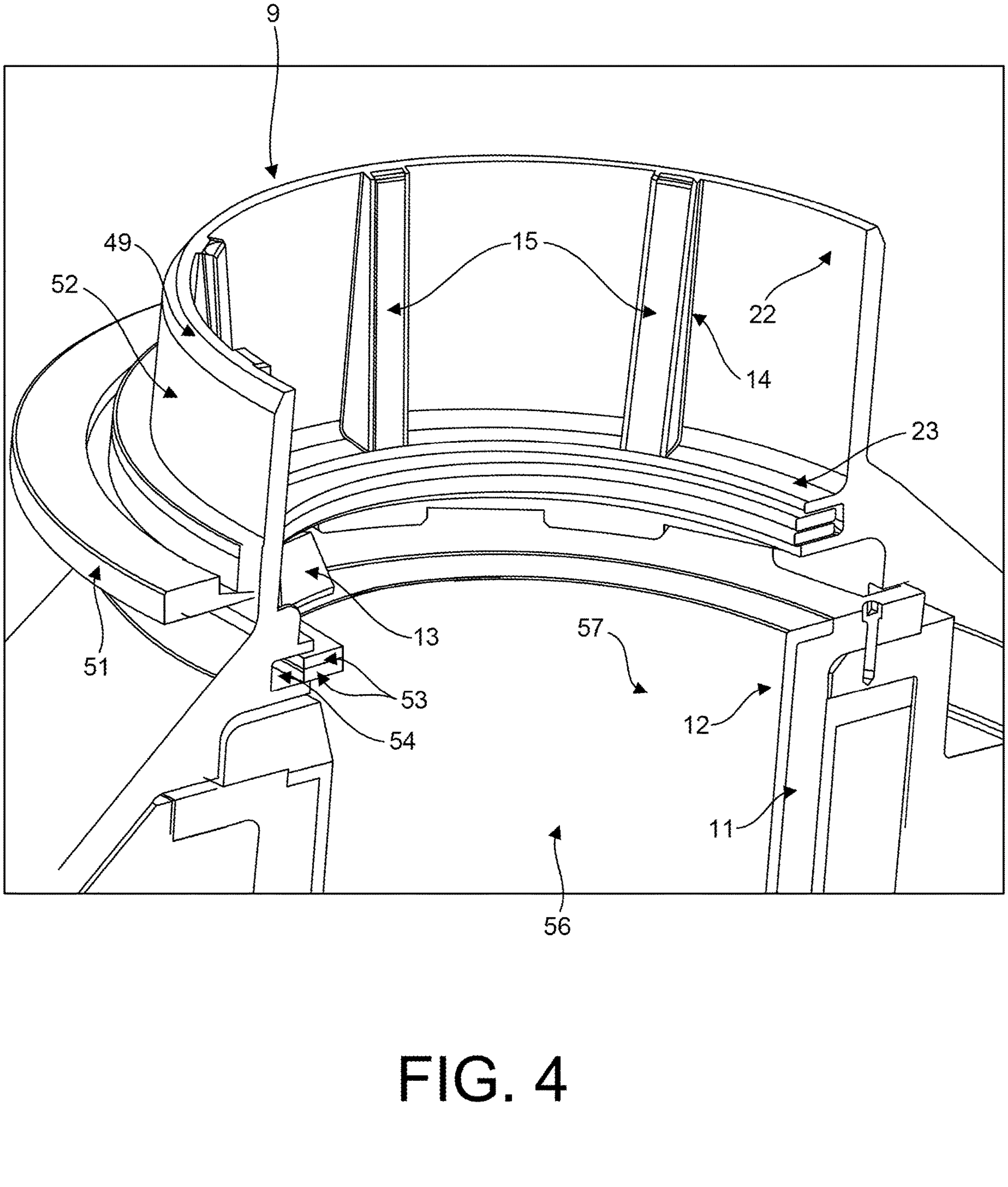
FIG. 4 illustrates a partial isometric cutaway view (with mainshaft assembly 2 removed), showing more clearly, a novel dust bonnet 9 and novel counterweight 13 of the gyratory crusher 1.
Figure 5:
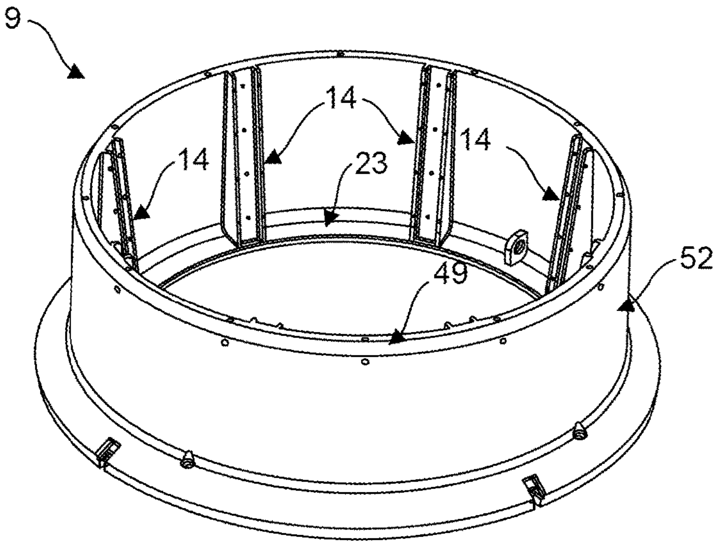
FIG. 5 illustrates the dust bonnet 9 shown in FIG. 4, wherein removable guides 15 are removed from guide mounts 14.
Figure 6:
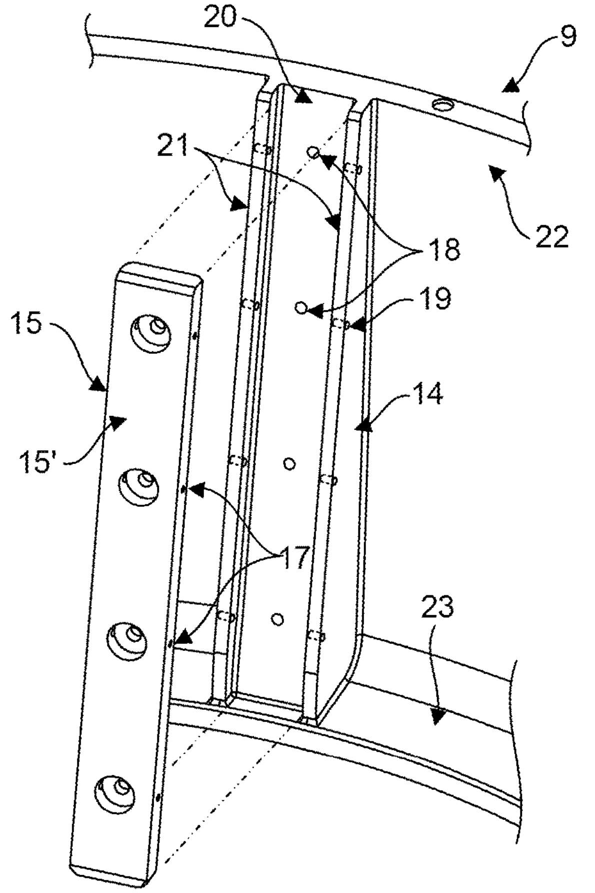
FIG. 6 illustrates an exploded diagram showing how replaceable guides 15 may be provided to guide mounts 14 on a dust bonnet 9 according to some non-limiting embodiments.
Figure 7:
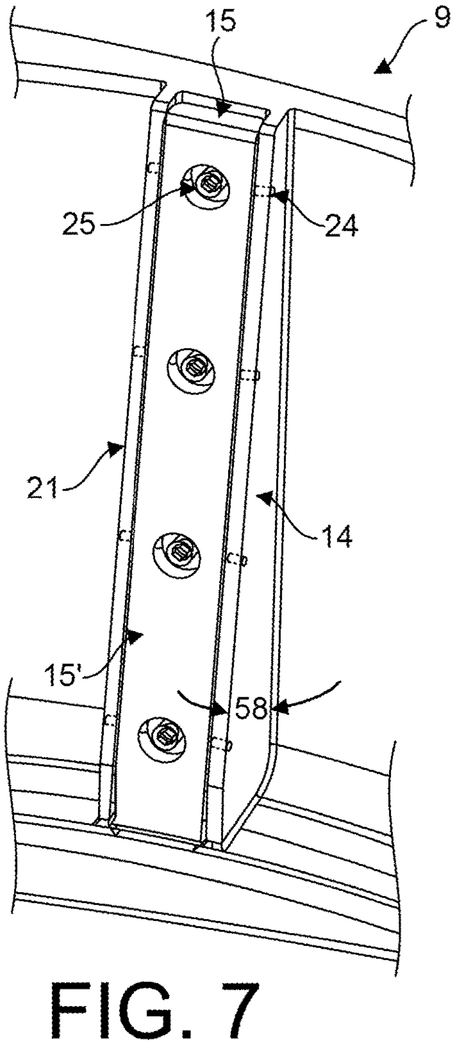
FIG. 7 illustrates a close-up view of a guide 15 assembled to guide mount 14 of the dust bonnet 9 shown in FIGS. 4-6.

As exemplified in FIGS. 3-7, the gyratory crusher 1 may differ from conventional gyratory crushers in that its dust bonnet 8 may comprise a number of guide mounts 14 provided to an inner sidewall 22 of the dust bonnet 9. The guide mounts 14 may extend at an angle between the inner sidewall 22 and a lower sidewall 23 of the dust bonnet 9 as shown. The lower sidewall 23 may extend radially inwardly (e.g., perpendicularly to the inner sidewall 22 when viewed in cross-section). The lower sidewall 23 may form a radially-inwardly extending shelf, lip, or flange, without limitation. A As depicted in FIG. 3, an upper peripheral region of the dust bonnet 9 may comprise an upper radially-outer chamfer 49 which is configured with an angle which works in harmony with a lower radially-inner chamfer 50 of dust seal 10 provided within the mainshaft assembly 2 and held in place by dust seal cover 51. As the mainshaft assembly 2 is lowered into place during mainshaft assembly 2 re-installation, the upper radially-outer chamfer 49 on the dust bonnet 9 engages the lower radially-inner chamfer 50 of the dust seal 10. The surfaces of the two chamfers 49, 50 engage and act as an inclined ramp surface to give a mechanical advantage in widening/radially-expanding annular dust seal 10 and/or guide inner surfaces of the dust seal 10 around outer peripheral surface 52 of dust bonnet 9. FIG. 3 shows a mainshaft assembly 2 position where the dust seal 10 has slid past the upper radially-outer chamfer 49 and past a majority of the outer peripheral surface 52 of the dust bonnet 9.

The guide mounts 14 may be configured with an integrally-formed guide surface or, as shown, may be configured to receive one or more separable guides 15. Each guide 15 may comprise, for instance, a replaceable wear surface or liner, without limitation. Guides 15 may comprise a bearing material such as bronze or a polymer, without limitation.

In the particular exemplary, non-limiting embodiment shown (most clear from FIG. 6), guide mounts 14 may each be provided with an inclined base surface 20, such as a ramp structure. The inclined base surface 20 may, itself, be a guide surface configured for and intended for sliding against an end plate 32 or other portion of mainshaft assembly 2 (e.g., an outer diameter or peripheral surface of lower mainshaft 26), without limitation. However, as shown, a replaceable/separable guide 15 may be affixed to the inclined base surface 20 using one or more fasteners 25 (e.g., machine screw, bolt), without limitation. It should be understood that permanent or semi-permanent attachment methods (e.g., brazing, welding, adhering) may be used to affix a guide 15 to a guide mount 14, without limitation.

To better support a guide 15 from lateral forces and/or side loading (e.g., tangential forces within dust bonnet 9) caused during mainshaft assembly 2 insertion, one or more side rails 21 protruding from inclined base surface 20 may be provided on either or both sides of the guide(s) 15 as shown. The side rails 21 may project radially inwardly from guide mount 14 with respect to the dust bonnet 9, and may extend along guide mount 14 at an angle between inner 22 and lower 23 sidewalls. The side rails 21 may extend generally perpendicularly from the inclined base surface 20, without limitation.

Each guide 15 may comprise one or more apertures 16 (e.g., one or more countersunk recesses) for receiving one or more respective fasteners 25 as depicted. An aperture 16 described herein may be sized and shaped to complimentarily receive a head of a fastener 25 as shown, and/or configured such that the fastener 25 does not protrude past an outer guide surface of a guide 15, without limitation.

One or more side apertures 17 may be provided transversely to a separable or integral guide 15 as shown, and these may serve to receive one or more respective side pins 24 for temporarily or permanently securing a guide 15 to a guide mount 14, without limitation. Side pins 24 may extend entirely through guide mount 14, or partially into each guide 15 as shown. Side pins 24 may comprise roll pins, rollers, screws or other type of fastener which are pressed screwed into, or otherwise received through a side rail 21 and guide 15, without limitation. Guide mounts 14 may also comprise one or more side apertures 19 to receive the side pins 24 as shown, without limitation. As shown in the particular embodiment, side pins 24 may intersect apertures 16 so as to serve as set screws against fasteners 25, or other locking features without limitation. As shown, side pins 24 may extend through side rails 21.

One or more mounting holes 18 may be provided to each guide mount 14 for receiving fasteners 25 (e.g., a fastener 25 extending through guide 15 and received within aperture 16).

Figure 8:
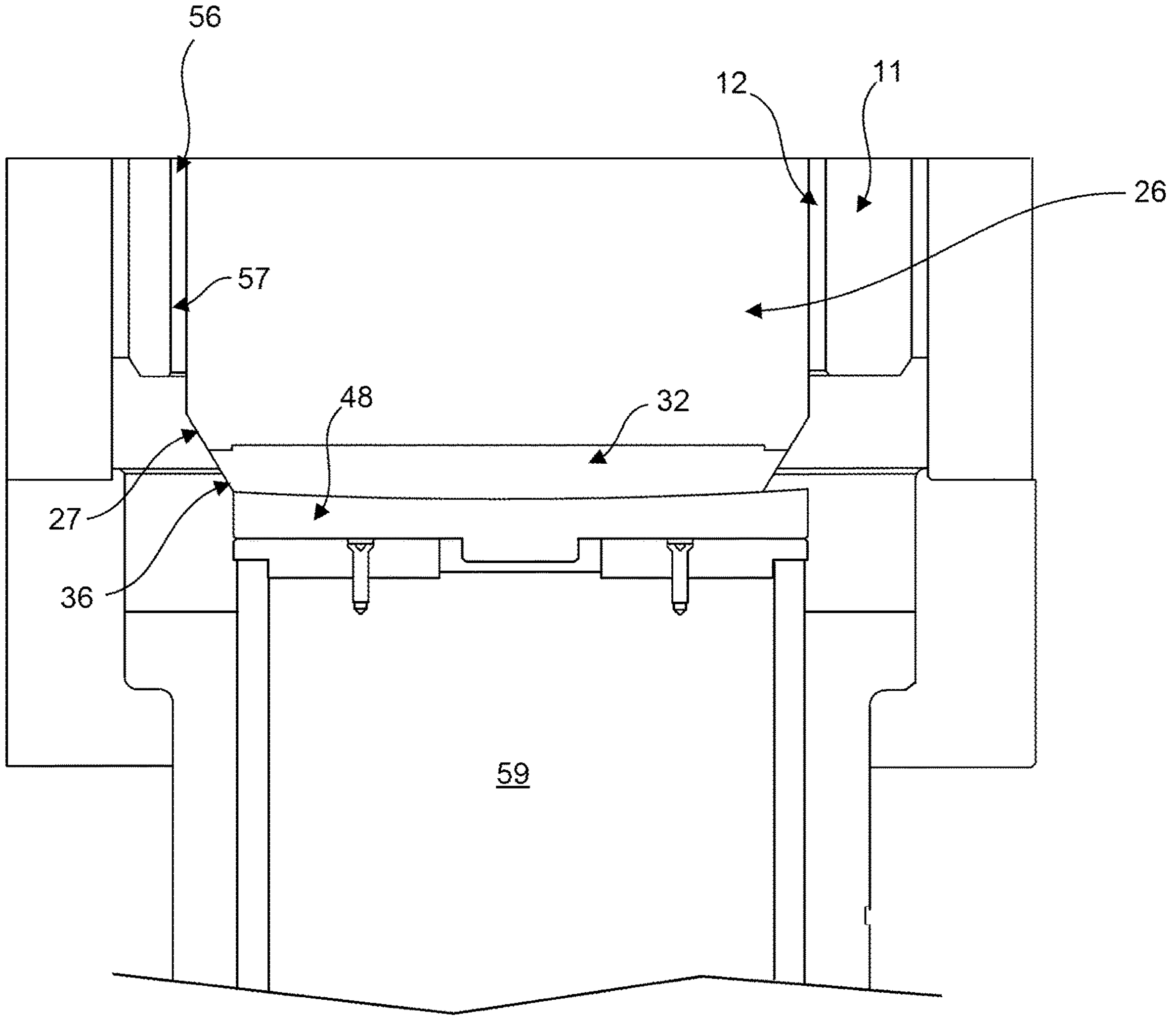
FIG. 8 illustrates an enlarged portion of FIG. 1 more clearly showing a region adjacent a lower distal end portion of mainshaft assembly 2 having novel end plate 32 and centering features 27, 36.
Figure 9:
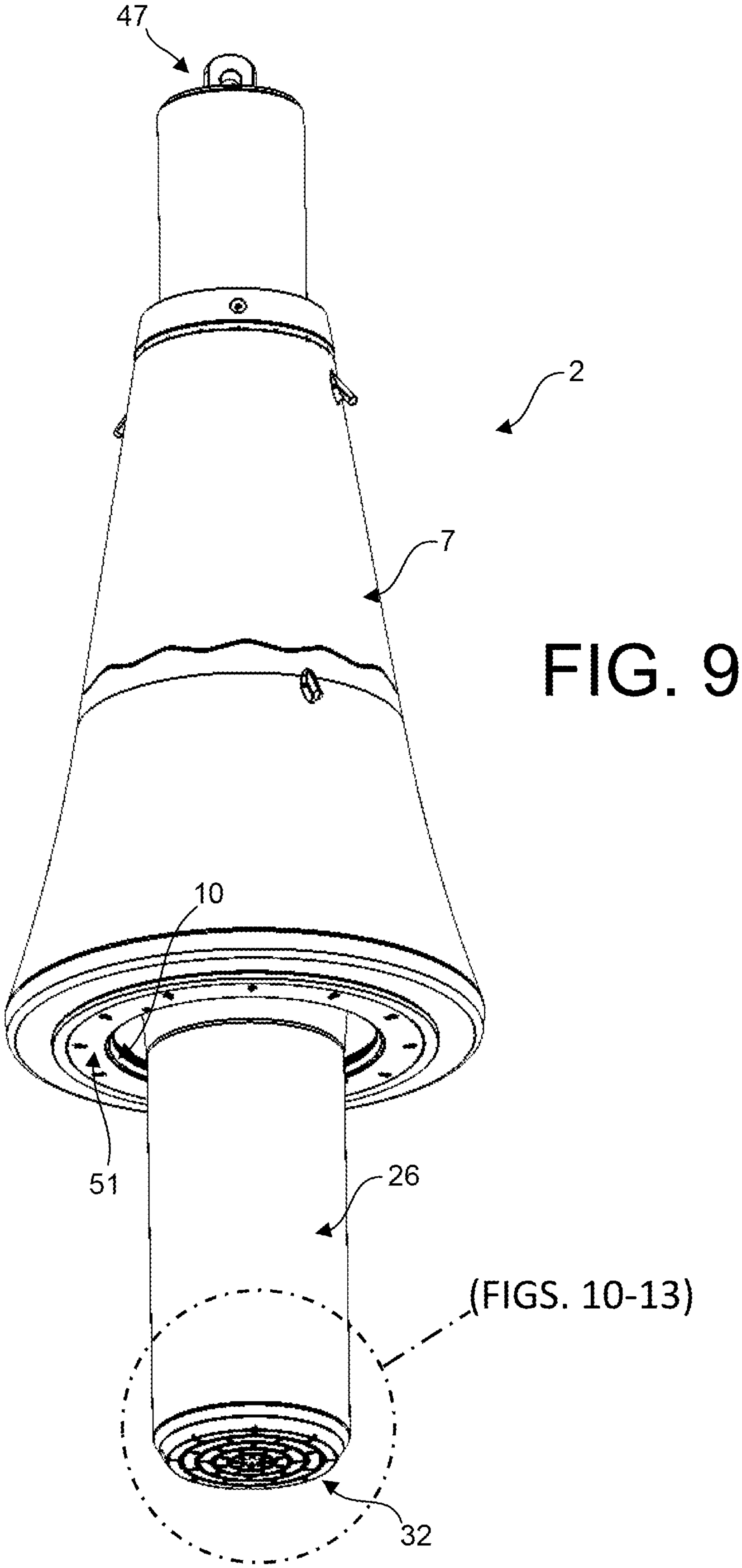
FIG. 9 illustrates a non-limiting exemplary embodiment of a mainshaft assembly 2 that may be provided to the gyratory crusher 1 shown in FIGS. 1 & 2.
Figure 10:
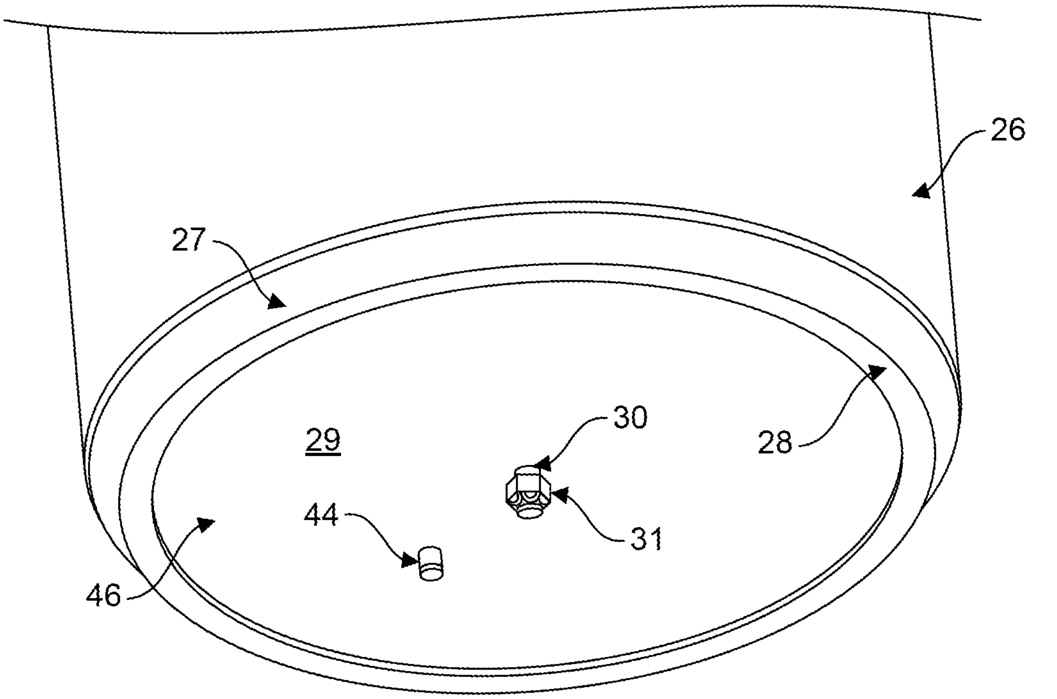
FIG. 10 illustrates a distal portion of mainshaft assembly 2, in particular, a lower mainshaft 26 having means for receiving an end plate 32 according to some non-limiting embodiments.
Figure 11:
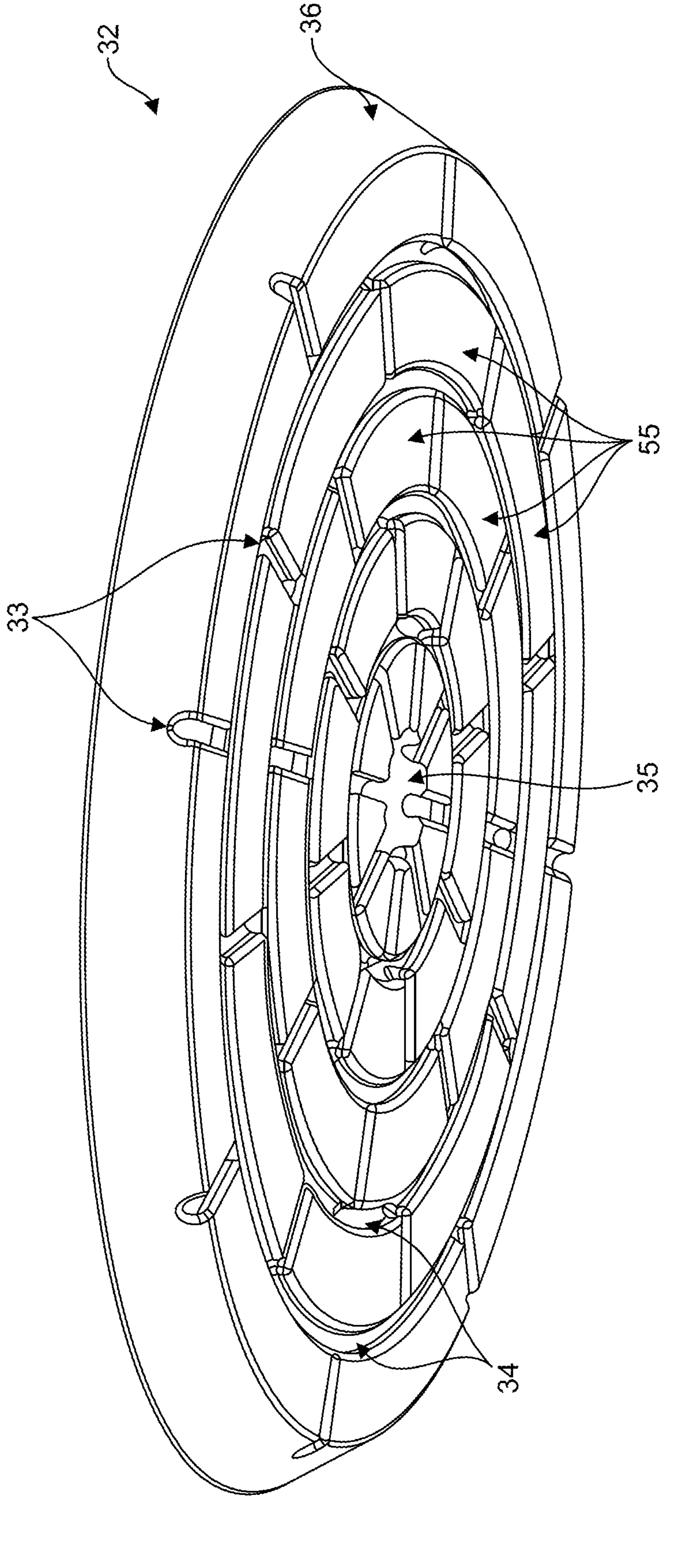
FIG. 11 is a lower isometric view of a novel end plate 32 according to some non-limiting embodiments, which may be provided to the lower mainshaft 26 shown in FIG. 10.
Figure 12:
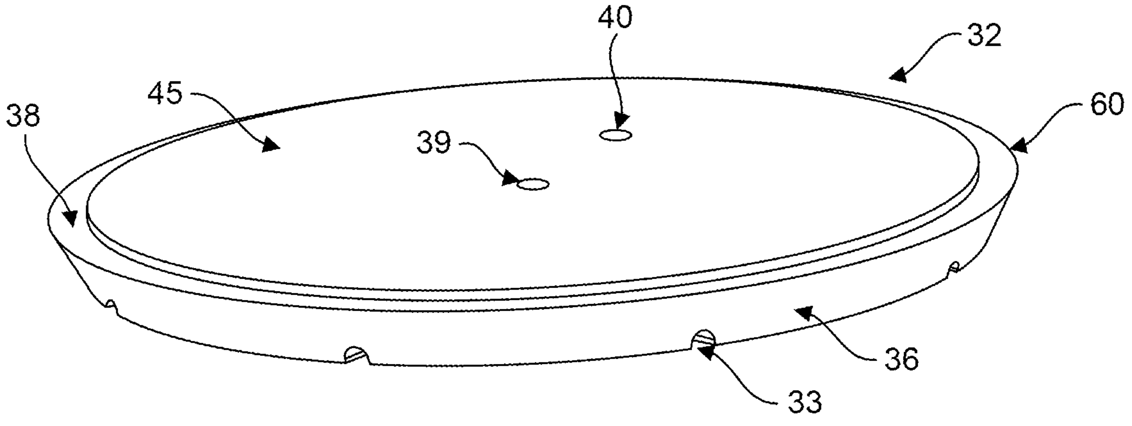
FIG. 12 is an upper isometric view of the end plate 32 shown in FIG. 11.

Turning now to FIG. 8, a distal portion of the mainshaft assembly 2 may be configured to rest on a thrust bearing 48, and the lower mainshaft 26 may be configured to be received within the lined eccentric 11.

As exemplified in FIGS. 9-13, the gyratory crusher 1 may differ from conventional gyratory crushers in that a lower mainshaft 26 of the mainshaft assembly 2 may comprise a specially-configured bottom plate 32. In some embodiments, the lower mainshaft 26 may comprise a recess 46 (FIG. 10) within its distal end as shown. The recess 46 may be defined, for example, by a bottom surface 29 surrounded by a lower annular projection 28, without limitation. The lower annular projection 28 may be continuous as shown; however, it may comprise interruptions (e.g., so as to be castellated or partially castellated, undulating, scalloped, or the like), without limitation. The lower annular projection 28 may be configured to engage with and/or abut an upper annular lip 38 adjacent an upper side of the end plate 32 as suggested in FIG. 13. Surfaces of the lower annular projection 28 may snugly abut complementary surfaces and/or geometric features of the lower annular projection 28, without limitation. The upper annular lip 38 of the end plate 32 may be defined around or surround an upper projection 45 which is configured to extend into recess 46 of the lower mainshaft 26, without limitation. The upper projection 45 may protrude upwardly from the upper annular lip 38 and may be arranged centrally and/or concentrically with respect thereto as shown.

A lower side of the bottom plate 32 may comprise a number of radial oil grooves 33 and/or one or more annular oil grooves 34 may be provided on its bottom surface, without limitation. The grooves 33, 34, may assist with the holding and channeling of oil between the end plate 32 and thrust bearing 48 thereby facilitating lubrication. The radial oil grooves 33 may be interrupted along a radial line as shown, so as to form a plurality of staggered arcuate block projections 55. The staggered arcuate block projections 55 may form a circular tile mosaic pattern as illustrated. The radial 33 and annular 34 oil grooves may be interconnected such that they collectively form a tortuous path for oil to move, thereby improving upon the "rose" pattern shown in FIGS. 14-16.

A central pocket 35 may be provided to the lower side of the end plate 32 for receiving a fastener 30 for securing the end plate 32 to the lower mainshaft 26. However, it is conceived that a pattern of spaced pockets (centrally-disposed or not) may be provided and arranged within end plate 32 in order to provide means for securing the end plate 32 to the lower mainshaft 26.

Figure 13:
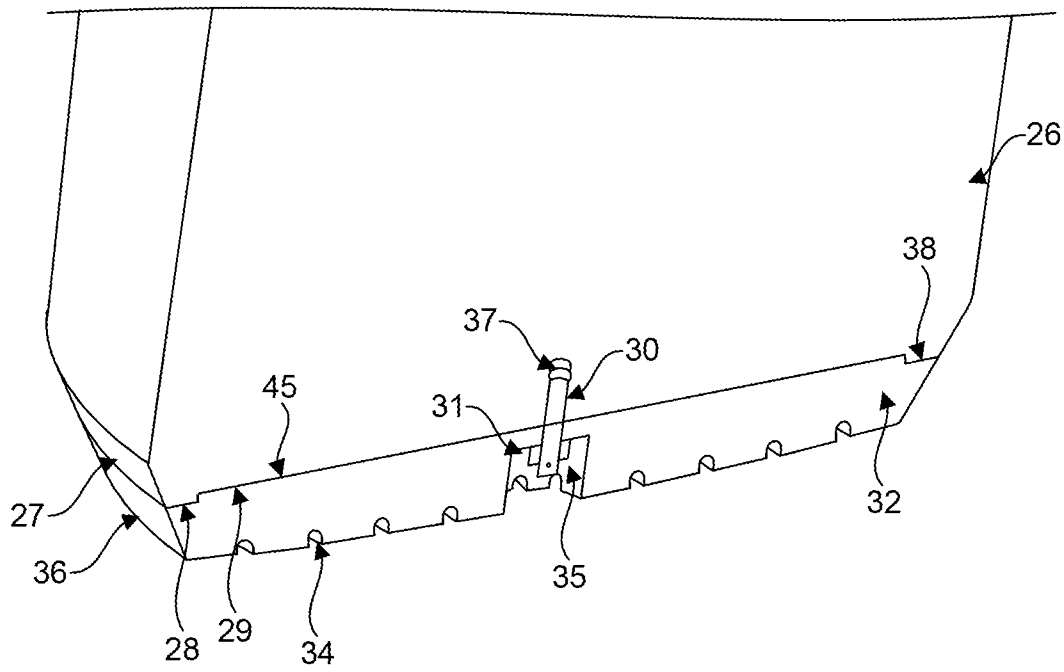
FIG. 13 illustrates the end plate 32 of FIGS. 11 and 12 installed on the lower mainshaft 26 of FIG. 10—in a cross sectional view.

As suggested in the particular non-limiting embodiment shown, the fastener 30 may comprise a bolt or threaded pin, without limitation. The fastener 30 may, as shown in FIG. 13, be received through an opening or mounting hole 39 in the end plate 32 and threaded into, welded into, or otherwise mounted within a bore 37 of the lower mainshaft 26 without limitation. The bore 37 may be centrally located within recess defined by bottom surface 29 and lower annular projection 28. The fastener 30 may comprise a projection integral with the lower mainshaft 26 and machined into the lower mainshaft 26, without limitation. A fastening nut or bolt head 31 may be situated within the central pocket 35 of the end plate 32 so as to be clear from impingement with the thrust bearing 48 supporting the lower side of end plate 32.

Another feature which may be employed to the end plate 32 is a lower alignment chamfer 36 (e.g., a frustoconical taper or lead-in surface). The lower alignment chamfer 36 may match the taper angle of an upper alignment chamfer 27 of the lower annular projection 28 as shown. A lower annular edge of the upper alignment chamfer 27 may abut or meet with an upper annular edge of the upper annular lip 38, as shown. Surfaces of the upper alignment chamfer 27 and lower alignment chamfer 36 may be flush with one another, collectively continuous, or generally follow the same outer chamfer taper angle—thereby creating a smooth homogeneous transition between lower mainshaft 26 and end plate 32.

To prevent relative movement between end plate 32 and lower mainshaft 26, mating surfaces between upper annular lip 38 and lower annular projection 28 may be interlocking (e.g., undulating, scalloped, undulating), without limitation. Moreover, the outer surface of upper projection 45 and inner surface of lower annular projection 28 can be complimentary splined surfaces, without limitation. However, as shown, in some embodiments, rotation of end plate 32 with respect to lower mainshaft 26 may be discouraged or prevented by providing one or more alignment pins 44 to bottom surface 29 such that they protrude into respective alignment holes 40. In this regard, upper projection 45 can be prevented from spinning within lower annular projection 28 during operation, which could cause loosening of fasteners 30, 31 attaching the end plate 32 to the lower mainshaft 26.

Figure 14:
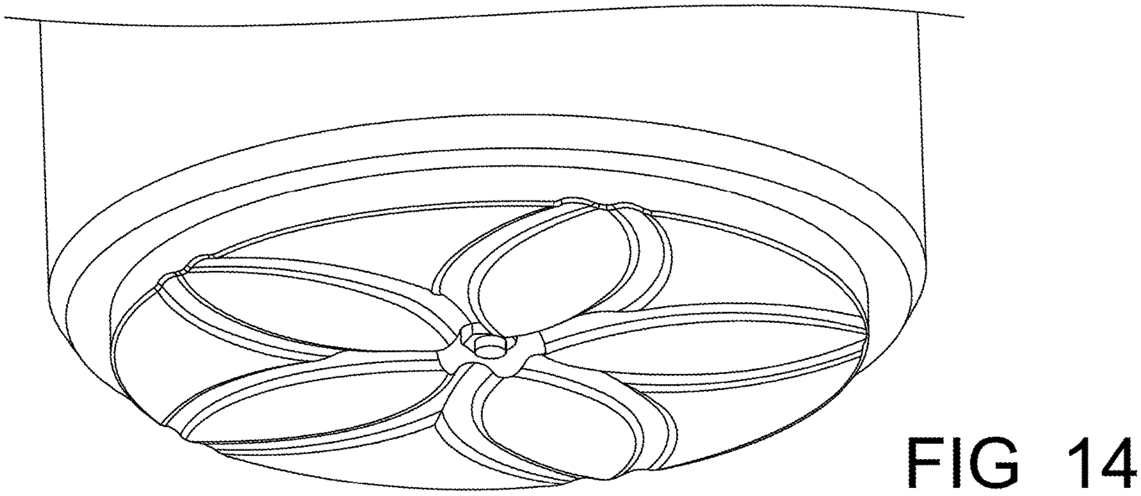
FIG 14 (PRIOR ART)
FIGS. 14-16 illustrate a conventional cylindrical end plate of the prior art, comprising oil grooves arranged in a traditional “rose” pattern.
Figure 15:
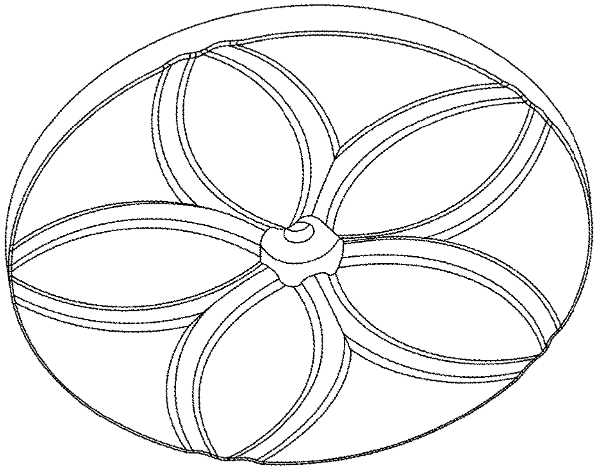
FIG. 15 (PRIOR ART)
Figure 16:
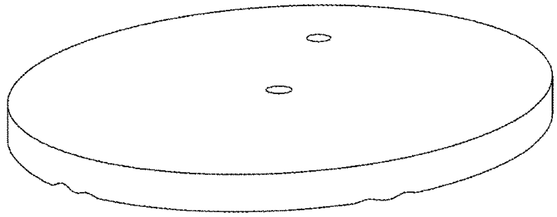
FIG. 16 (PRIOR ART)

FIGS. 14-16 show a conventional end plate (according to the prior art) of which end plate 32 aims to improve upon. As can be seen from these figures, a conventional end plate comprises a cylindrical body provided with a rose pattern of oil grooves at its lower surface. The outer peripheral cylindrical surface is radially-inwardly inset from other surfaces of a distal end of a lower mainshaft. Clearly, this traditional design lacks the novel and useful features described above for end plates 32 according to embodiments of the invention.

Figure 17:
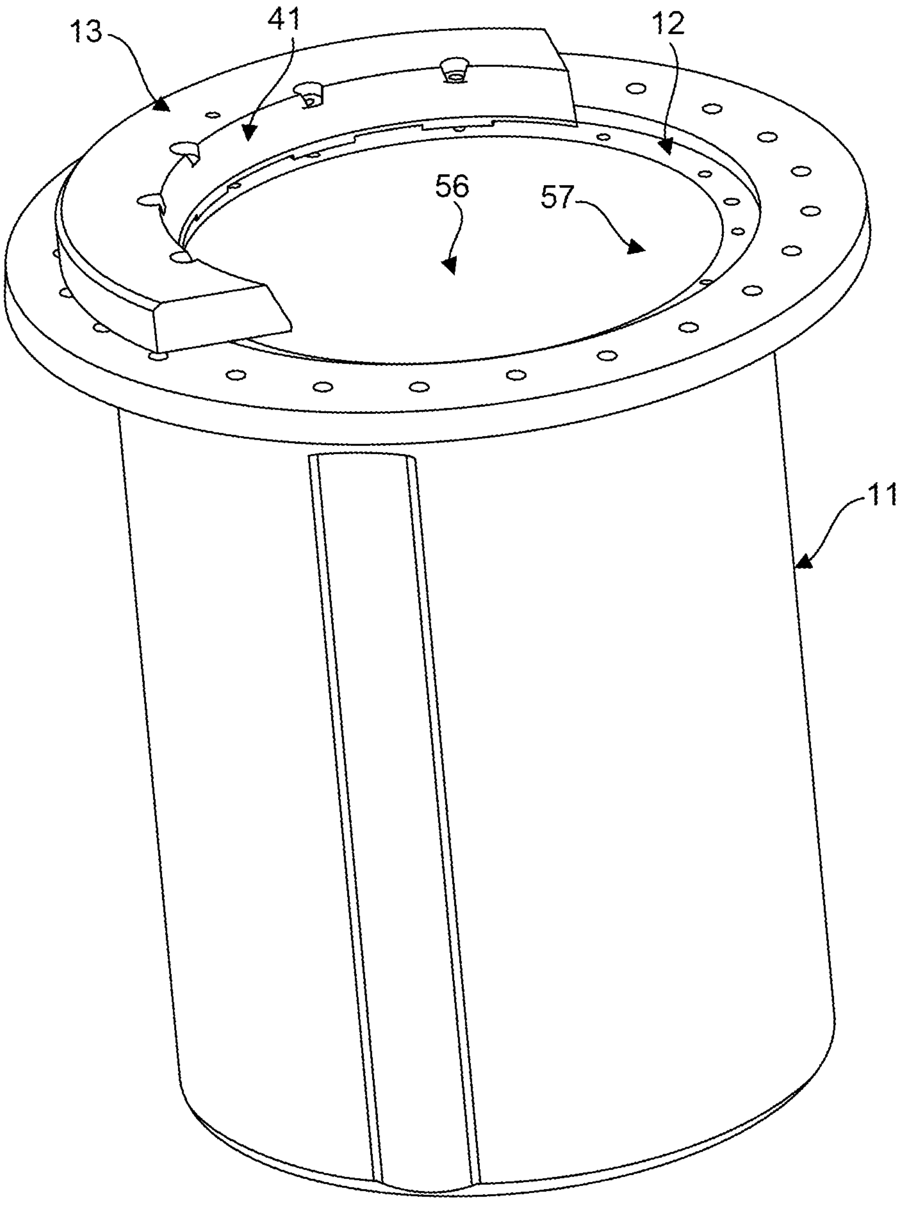
FIG. 17 illustrates a novel counterweight 13 having a specialized chamfer 41 in its mounting position relative to a bore 56 or inner diameter 57 of an eccentric 11 or liner 12 thereof, according to some non-limiting embodiments.
Figure 18:
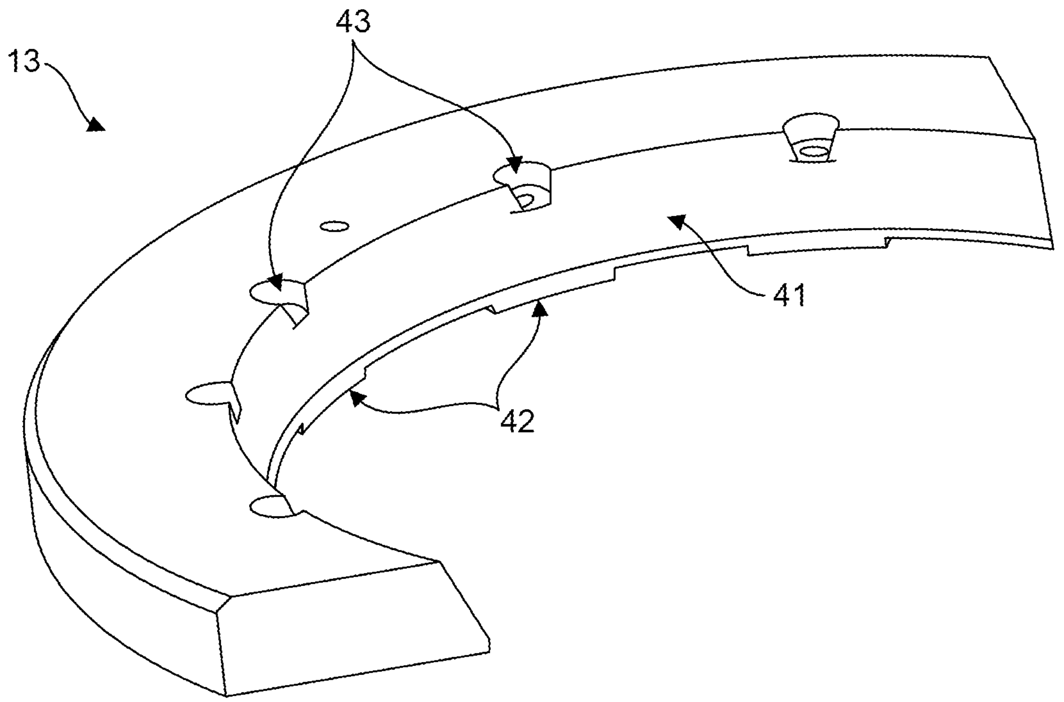
FIG. 18 illustrates a top isometric view of the counterweight 13 shown in FIG. 17.
Figure 19:
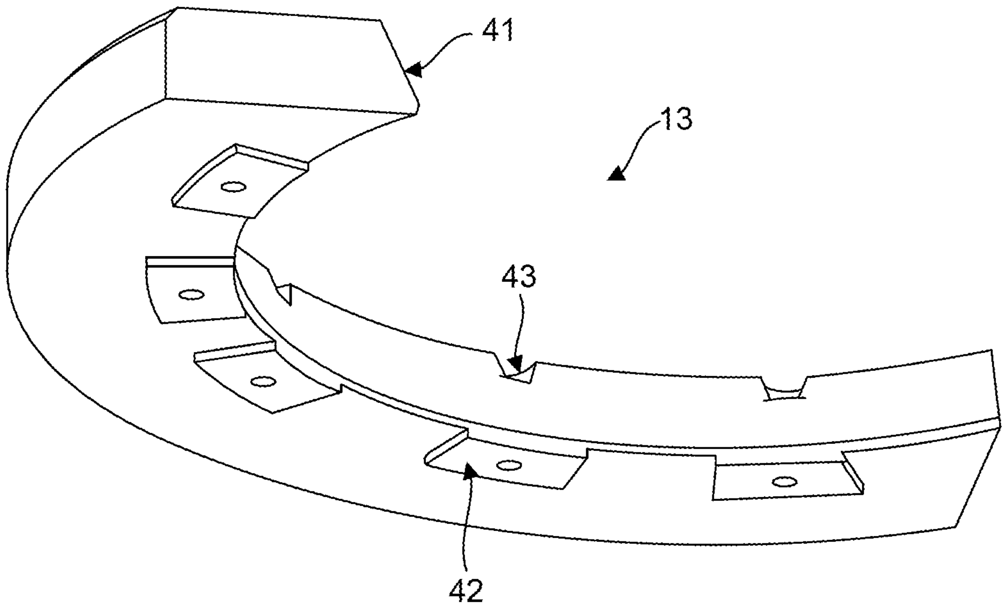
FIG. 19 illustrates a bottom isometric view of the counterweight 13 shown in FIGS. 17 and 18.

Turning now to FIGS. 17-19, another novel feature of the gyratory crusher 1 is the provision of an alignment chamfer 41 to a counterweight 13 which is intended for attaching to an upper portion of an eccentric 11 and/or liner 12 thereof. The counterweight may comprise a non-annular arcuate shape (e.g., a "C" shape), as shown, without limitation.

The alignment chamfer 41 may, as shown, be provided to an inner concave portion of the counterweight, such that the counterweight 13 is generally narrower in width adjacent an upper part of the counterweight 13 and generally wider in width adjacent a lower part of the counterweight 13.

In some embodiments, a number of projections 42 may be provided to a lower face of the counterweight 13 (FIG. 19). These projections 42 may serve as centering features, without limitation. As shown in FIG. 17, the projections 42 may rest in a gap shelf between eccentric 11 and inner liner 12. Mounting holes 43 (which may be countersunk as shown) may be provided through counterweight 13. In some embodiments, such as the one shown, mounting holes 43 may extend into, disrupt, or intersect the alignment chamfer 41. Mounting holes 43 may also extend through projections 42, for example, to increase length of engagement between the fasteners and the mounting holes 43. The mounting holes 43 may enable fasteners (not shown) to pass through the counterweight and into a portion of the eccentric 11 and/or liner 12 to secure the counterweight 13 thereto.

Figure 20:
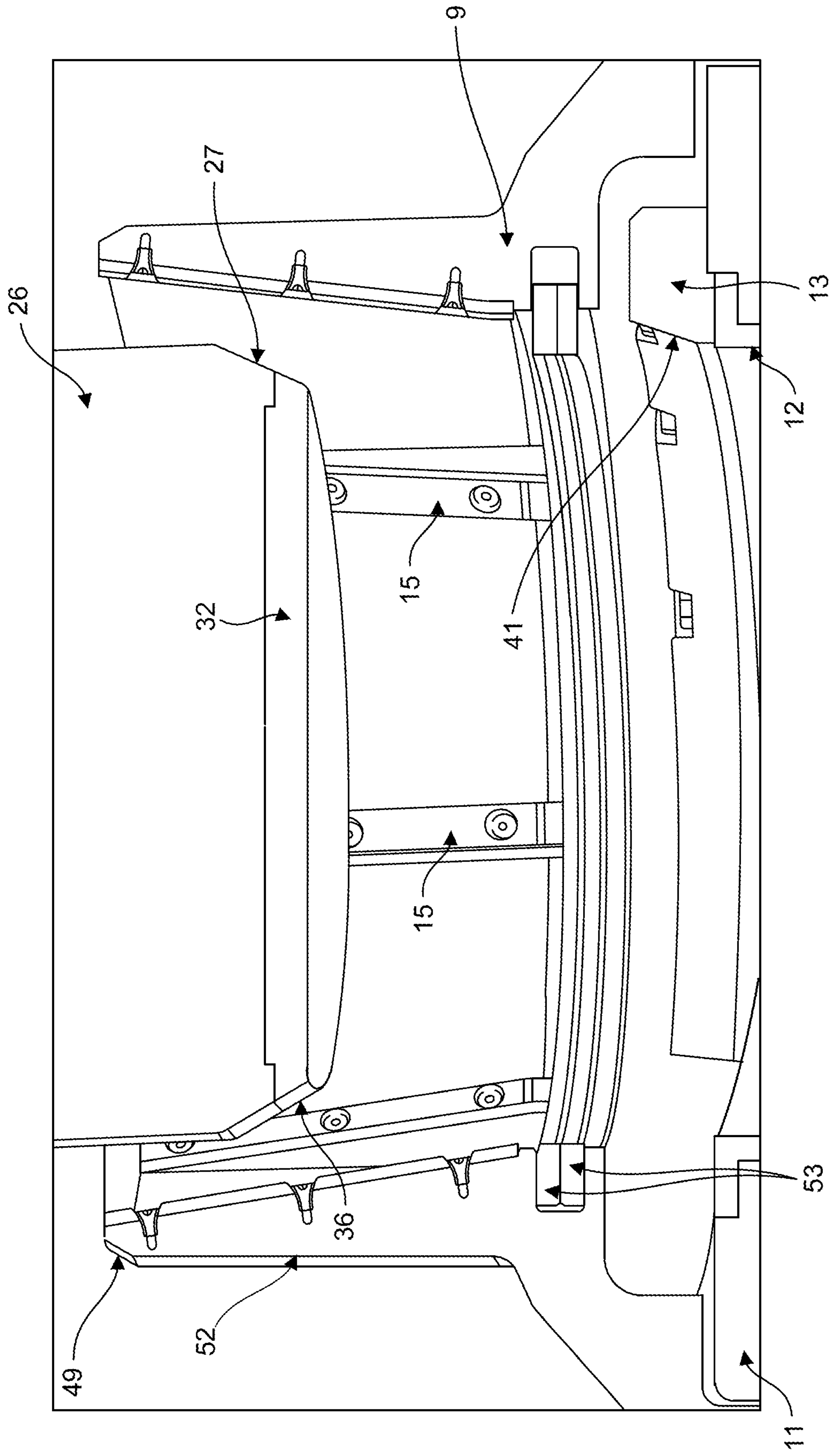
FIGS. 20 and 21 illustrate first and second method steps of introducing a mainshaft assembly 2 into a gyratory crusher 1 dust bonnet 9 according to non-limiting embodiments, respectively.
Figure 21:
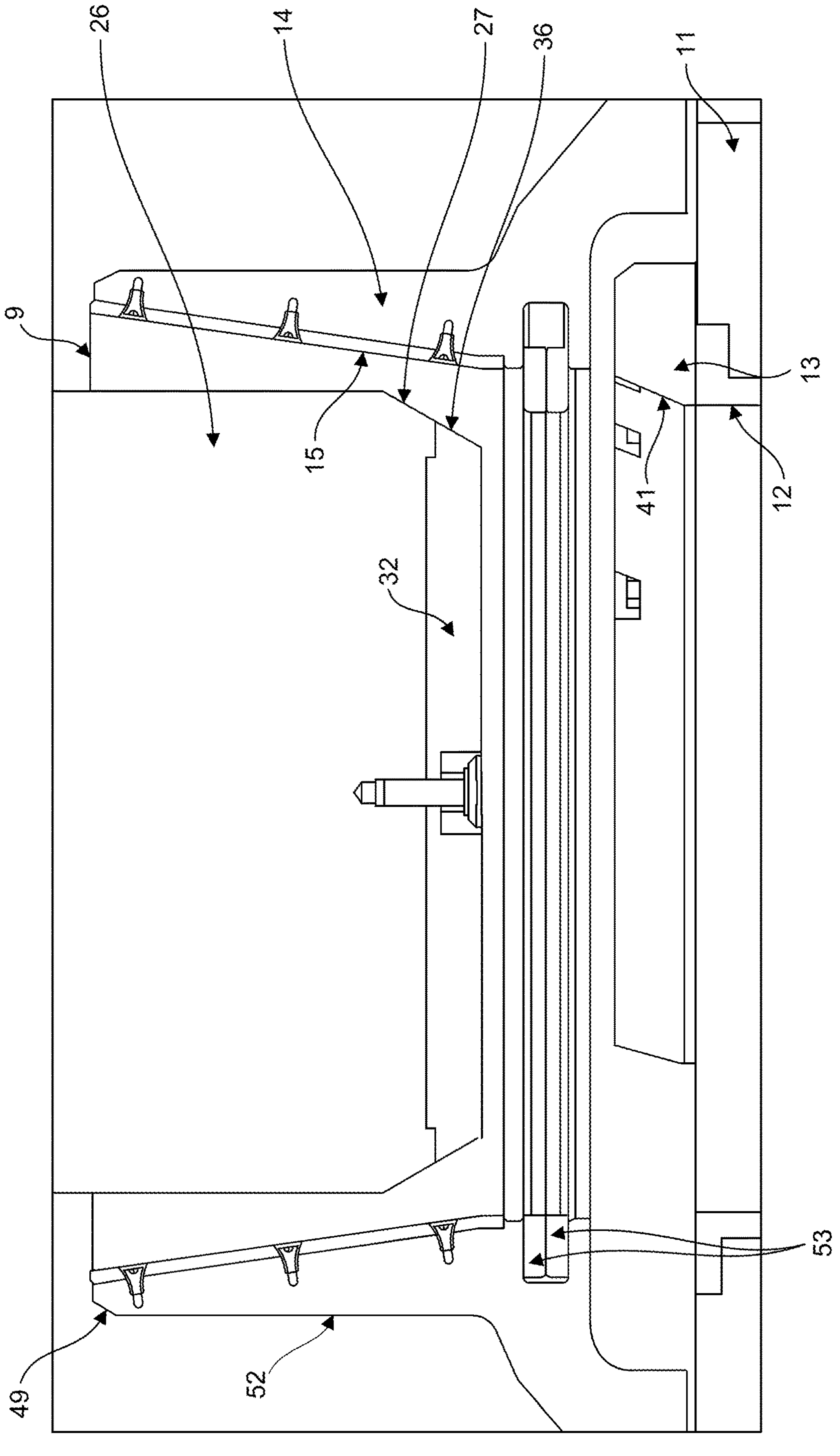

Turning now to FIGS. 20-21, as the mainshaft assembly 2 is lowered into the gyratory crusher 1 during reintroduction or reassembly, guides 15 help "rough center" the lower mainshaft 26 into alignment with the oil seal(s) 52 and/or eccentric 11. The smooth lead-in taper collectively formed by the flush lower alignment chamfers 27, 36 presents itself to oil seal(s) 53 to more "finely align" the lower mainshaft 26 with the oil seal(s) 53 and/or eccentric 11. As the mainshaft assembly 2 is further lowered into the gyratory crusher 1, oil seal(s) 53 may be guided around outer peripheral surfaces (i.e., the outer diameter of) lower mainshaft 26.

Upon even further lowering of mainshaft assembly 2, the smooth lead-in taper collectively formed by the flush lower alignment chamfers 27, 36 subsequently presents itself to the alignment chamfer 41 of counterweight 13. One or both of lower alignment chamfers 27, 36 may ride against surfaces of alignment chamfer 41 to supplementally finish guiding the lower mainshaft 26 into the eccentric 11 (e.g., into a liner 11 disposed therein), without limitation.

Synergistic combinations of features 15, 27, 36, 41, 49, 50, disclosed herein may contribute to a greater self-aligning/self-centering effect.

The disclosure of every patent, patent application, and publication cited, listed, named, or mentioned herein is hereby incorporated by reference in its entirety, for any and all purposes, as if fully set forth herein.

While this subject matter has been disclosed with reference to specific embodiments, it is apparent that other embodiments and variations can be devised by others skilled in the art without departing from the true spirit and scope of the subject matter described herein. The appended claims may include some, but not all of such embodiments and equivalent variations.

For example, it is envisaged that in some embodiments, an eccentric liner 12 may be entirely optional. The eccentric liner 12 may be omitted from the eccentric 11 (wherein the bore 56 and/or inner diameter 57 may be formed directly through the body of eccentric 11). Or, an eccentric liner 12 may be provided as an integral surface portion of eccentric 11. The eccentric liner 12 and eccentric 11 may be, in some embodiments, provided as a monolithic unitary structure and may be inseparable from each other, without limitation. The eccentric liner 12 and eccentric may also be provided as separable parts which have a clearance fit or press fit between them. Accordingly, where it is used herein and in the claims, the terms "bore 56" and "inside diameter" 57 may relate to an opening through an eccentric 11 or its liner 12—whichever is smaller in diameter, configured to receive the lower mainshaft 26, and/or which comprises the bearing surfaces designed to abut, envelope, or constrain lateral movement of the outer peripheral diametrical surface of lower mainshaft 26, without limitation.

As yet another example, it should be further understood that where it is used herein and in the claims, the term "guide 15" may refer to a separable guide structure that is removably affixed or mounted to a separate guide mount 14 as depicted in the figures; or, it may broadly refer to or encompass any structure connected to, integral with, attached to, or extending from the inner sidewall 22 of the dust bonnet 9 which is adequately configured to help concentrically align a lower mainshaft 26 of the mainshaft assembly 2 with one or more oil seals 53 and/or the inside diameter 57 of bore 56 of the eccentric 11 or its optional liner 12. The term "guide 15" may also refer to or encompass any structure connected to, integral with, attached to, or extending from the inner sidewall 22 of the dust bonnet 9 which is adequately configured to help guide the lower mainshaft 26 into an oil seal(s) 53, eccentric 11, eccentric liner 12, bore 56, and/or inside diameter 57 when the mainshaft assembly 2 is lowered into the gyratory crusher 1, without limitation.

The described embodiments are to be considered in all respects only as illustrative and not restrictive. The scope of the invention is, therefore, indicated and governed only by the appended claims, rather than by the foregoing description. All embodiments which come within the meaning and range of equivalency of the claims are to be embraced within their scope.

A contractor or other entity may provide a gyratory crusher 1 or component(s) thereof as substantially shown and described herein, or, may practice any one or more of the methods or method steps shown and described herein, without limitation. A contractor or other entity may operate a gyratory crusher 1 as shown and described.

A contractor or other entity may fabricate, provide, or install a gyratory crusher 1 as substantially shown and described herein, and this may include conversion of an existing gyratory crusher to provide a gyratory crusher 1 configured to improve mainshaft self-alignment during installation. A contractor or other entity may receive a bid request for a project related to designing, fabricating, delivering, installing, operating, or performing maintenance on a gyratory crusher, or, for providing a component thereof as substantially described herein, with the intention or purpose of converting an existing gyratory crusher to one incorporating the inventive features, concepts, and associated advantages described herein. A contractor or other entity may offer to design such a gyratory crusher 1 or component thereof, for a client. A contractor or other entity may subcontract or facilitate the fabrication, delivery, sale, and/or installation of any component(s) of the gyratory crusher disclosed.

The contractor or other entity may also maintain, modify, retrofit, or upgrade a gyratory crusher (or one or more components thereof) in order to produce a gyratory crusher 1 as shown and described. The contractor or other entity may provide such maintenance or modifications by subcontracting such services or by directly providing those services or components needed for said maintenance, modifications, retrofit, or upgrades. In some cases, the contractor or other entity may modify an existing gyratory crusher by virtue of provision of a retrofit kit to arrive at a modified gyratory crusher 1 comprising any number of the components described herein, or one or more of the inventive method steps, design features, devices, or inventive concepts discussed herein.

Although the invention has been described in terms of particular embodiments and applications, one of ordinary skill in the art, in light of this teaching, can generate additional embodiments and modifications without departing from the spirit of or exceeding the scope of the claimed invention.

REFERENCE NUMERAL IDENTIFIERS

1. Gyratory crusher
2. Mainshaft assembly
3. Lower top shell
4. Bottom shell
5. Top shell
6. Spider
7. Mantle (e.g., outer crushing surface liner)
8. Concave (e.g., inner crushing surface liner)
9. Dust bonnet
10. Dust seal
11. Eccentric
12. Eccentric liner (e.g., bushing)
13. Counterweight
14. Guide mount
15. Guide (e.g., replaceable wear surface or liner)
15' Guiding surface
16. Aperture (e.g., countersunk recess)
17. Side aperture
18. Mounting hole
19. Side aperture
20. Inclined base surface
21. Side rails
22. Inner sidewall
23. Lower sidewall
24. Side pin
25. Fastener (e.g., machine screw, bolt)
26. Lower mainshaft
27. Lower alignment chamfer (of lower mainshaft 26)
28. Lower annular projection
29. Bottom surface
30. Fastener (e.g., bolt, threaded pin, threaded protrusion)
31. Fastening nut (or head of bolt 30)
32. Bottom plate
33. Radial oil groove(s)
34. Annular oil groove(s)
35. Central pocket
36. Lower alignment chamfer (of bottom plate 32)
37. Bore (e.g. threaded)
38. Upper annular lip
39. Mounting hole
40. Alignment hole
41. Alignment chamfer
42. Projections
43. Mounting holes

44. Alignment pin
45. Upper projection
46. Recess
47. Lift hook
48. Thrust bearing
49. Upper radially-outer chamfer (of dust bonnet 9)
50. Lower radially-inner chamfer (of dust seal 10)
51. Dust seal cover
52. Outer sidewall (of dust bonnet 9)
53. Oil seal(s)
54. Oil seal cavity
55. Staggered arcuate block projections (forming circular tile mosaic pattern)
56. Bore (of eccentric 11 or optional eccentric liner 12)
57. Inside diameter of (of bore 56)
58. Angle (e.g., between guiding surface 15' and inner sidewall 22, between radially-inner surface of guide mount 14 and inner sidewall 22)
59. Hydraulic cylinder
60. Top annular edge (of end plate 32)

The invention claimed is:

1. A dust bonnet (9) configured for installation and use within a gyratory crusher (1), and configured for receiving a lower mainshaft (26) of a mainshaft assembly (2) therethrough, the dust bonnet (9) comprising:
an inner sidewall (22);
an outer sidewall (52);
a guide (15) including a guiding surface (15') forming an angle (58) with respect to the inner sidewall (22) and having a lower portion positioned further radially-inwardly with respect to the inner sidewall (22) than a respective upper portion;
an oil seal cavity (54) configured for receiving one or more annular oil seals (53);
the oil seal cavity (54) being located below said guiding surface (15') and extending into the inner sidewall (22); and
an upper radially-outer chamfer (49) proximate an upper rim of the dust bonnet.

2. The dust bonnet (9) according to claim 1, further comprising a plurality of guides (15).

3. The dust bonnet (9) according to claim 2, wherein the guides (15) are removably affixed to guide mounts (14).

4. The dust bonnet (9) according to claim 2, comprising one or more annular oil seals (53) located below the guides (15).

5. The dust bonnet (9) according to claim 4, wherein said one or more annular oil seals (53) are provided in the oil seal cavity (54).

6. The dust bonnet (9) according to claim 1, wherein the dust bonnet comprises a lower sidewall (23) extending radially inwardly with respect to the inner sidewall (22).

7. A gyratory crusher (1) comprising:
the dust bonnet (9) according to claim 1.

8. The gyratory crusher of claim 7, further comprising:
an eccentric (11) or eccentric liner (12) having a bore (56).

9. The gyratory crusher of claim 7, further comprising an end plate (32) provided to a lower distal end of a mainshaft assembly (2), the end plate (32) comprising a lower alignment chamfer (36) at its radially-outermost periphery.

10. The gyratory crusher of claim 7, further comprising a counterweight (13) comprising a C-shaped arcuate profile having two ends, and a concave alignment chamfer (41) being defined by a ramped surface.

11. A dust bonnet (9) configured for installation and use within a gyratory crusher (1), and configured for receiving a lower mainshaft (26) of a mainshaft assembly (2) therethrough, the dust bonnet (9) comprising:
an inner sidewall (22);
an outer sidewall (52);
a plurality of guides (15); and
an upper radially-outer chamfer (49) proximate an upper rim of the dust bonnet (9); wherein the plurality of guides (15) are removably affixed to guide mounts (14).

12. The dust bonnet (9) according to claim 11, further comprising an oil seal cavity (54) configured for receiving one or more annular oil seals (53).

13. The dust bonnet (9) according to claim 12, further comprising one or more annular oil seals (53) provided within the oil seal cavity (54).

14. The dust bonnet (9) according to claim 12, wherein the oil seal cavity (54) is located below the plurality of guides (15).

* * * * *